United States Patent [19]

Dinse et al.

[11] Patent Number: 4,492,984

[45] Date of Patent: Jan. 8, 1985

[54] DRUM SCANNERS

[75] Inventors: Wolfgang Dinse, Altenholz; Ralf Balzeit, Preetz; Reinhard Gesell, Schönkirchen, all of Fed. Rep. of Germany

[73] Assignee: Dr.-Ing. Rudolf Hell GmbH, Kiel, Fed. Rep. of Germany

[21] Appl. No.: 438,016

[22] Filed: Nov. 1, 1982

[51] Int. Cl.³ .................... H04N 1/06; H04N 1/04
[52] U.S. Cl. .................................. 358/289; 358/285; 355/3 DR
[58] Field of Search .......... 358/289, 285, 286, 291; 355/3 DR

[56] References Cited

U.S. PATENT DOCUMENTS

| | | | |
|---|---|---|---|
| 3,069,494 | 12/1962 | Fischer | 358/289 |
| 4,105,345 | 8/1978 | Van Wagner | 355/3 DR |
| 4,134,669 | 1/1979 | Reitner | 355/3 DR |
| 4,400,077 | 8/1983 | Kozuka et al. | 355/3 DR |

Primary Examiner—Howard W. Britton
Assistant Examiner—John K. Peng
Attorney, Agent, or Firm—Brisebois & Kruger

[57] ABSTRACT

A roller for drum scanners is described, consisting of a hollow cylindrical element which is arranged for rotation at its ends and provided with suction openings for reception of a record carrier or of an original. The cylindrical roller element is assembled from a plurality of individual elements which are held together by means of a rod which may be screwed to end lid members of the roller element and are also bonded to each other.

17 Claims, 2 Drawing Figures

DRUM SCANNERS

BACKGROUND OF THE INVENTION

The present invention relates to rollers for drum scanners, comprising a hollow cylindrical element which is rotatably mounted at its ends.

As compared to flat bed scanners, drum scanners comprise rapidly rotating rollers at the scanning and recording stations, the original which is to be scanned being secured thereto at the scanning station and the recording carrier thereto at the recording station. To obtain a high operating speed on such scanners, it is necessary to allow the roller to rotate rapidly which on the one hand leads to powerful centrifugal forces and because of the originals having the large format desirable nowadays renders a stable form of construction of the rollers necessary. In order that the recording carrier may be held on the roller even at high speeds of revolution, the roller has suction openings in its surface, which are in communication with the interior which is arranged to be connected to a vacuum pump so that a vacuum prevails within the roller. If desired, clamping devices may be omitted, which could lead to an undesirable imbalance at high speeds of revolution. In view of the high precision required during image processing, a high mechanical precision is equally of importance regarding the geometry of the roller surface. In the existing methods of roller production, be it by parting off from prefabricated tubes or by turning the rollers from the solid, comparatively high costs and a heavy form of roller construction are the result.

SUMMARY OF THE INVENTION

Consequently it is an object of the invention to provide a roller which fulfils the manifold requirements specified in respect of the same and averts the disadvantage of the known roller. The invention accomplishes this aim by providing a roller for a drum scanner, comprising a hollow cylindrical element which is arranged for rotation at its ends, and comprises a plurality of pot-like structures which are joined together to form a continuous outer surface. The pot-like elements may interfit one within another, or they may comprise a number of rings which are connected at their joints by means of annular coupling members and bonded to each other thereat. One or more internal round metal plates assure that the round shape is maintained. Rollers in which use is made of a combination of the aforesaid structural features are also envisaged.

BRIEF DESCRIPTION OF THE DRAWINGS

In order that the invention may be more clearly understood, reference will now be made to the accompanying drawings which show two embodiments thereof by way of example and in which.

DETAILED DESCRIPTION OF PREFERRED EMBODIMENTS

Figure 1:
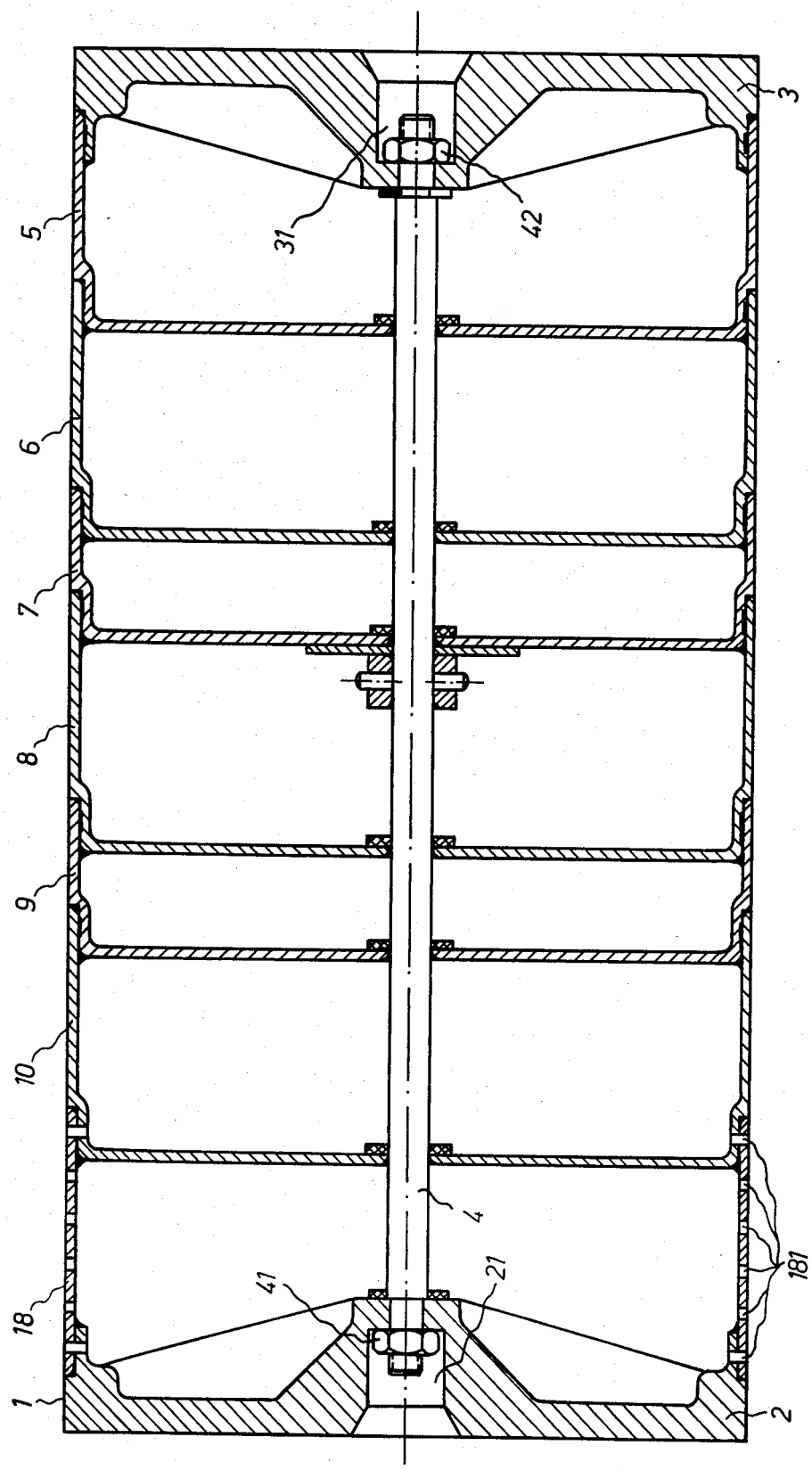
FIG. 1 shows an axial section through a first embodiment comprising pot-like structures which are interfitted one within the other.

Referring now to the drawings FIG. 1 shows a roller 1 which is assembled from several parts in accordance with the invention. At the ends are situated lids 2 and 3 which have central recesses 21 and 31 respectively, into which penetrates a rod 4 passing along the central longitudinal axis of the roller 1 the parts being tightened together by means of nuts 41 and 42. The actual cylindrical roller element comprises pot-like structures 5 to 10 which are interfitted one within the other, a ring 18 being provided at the one extremity of the roller to establish a closure together with the lid 1. As apparent from the drawings, the pot-like structures 5 to 10 are shouldered at their ends so that the next element may be pushed over the same. Upon assembling the individual elements, the joints between them are filled with adhesive, and the roller element is pulled together by means of the rod 4 and the nuts 41 and 42, so that a precisely cylindrical element is the result, assuming that the ends of the individual elements had been accurately made. Suction openings 181 which have been shown only for the element 18 in the drawing, are provided in the roller surface to hold the material which is to be clamped, be it the original or the record carrier, on the revolving roller surface. The roller surface may be provided with several rows of such suction holes throughout its surface, which are communication with a vacuum prevailing within the roller.

Figure 2:
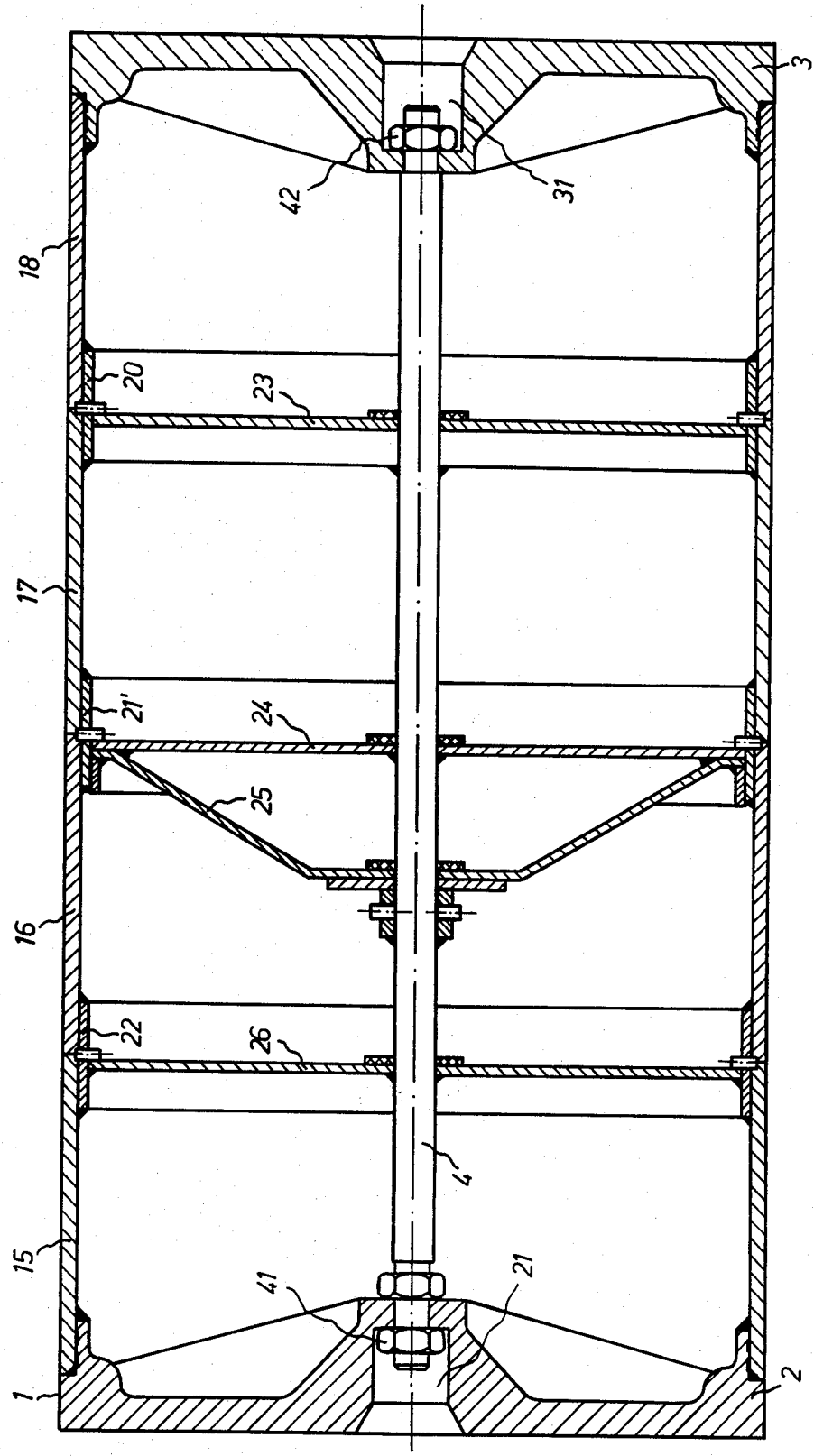
FIG. 2 shows an axial section through a second embodiment comprising rings which are joined together by means of annular coupling members.

FIG. 2 shows a similar structure of a roller 1, which at its ends also comprises lids 2 and 3 comparable to FIG. 1, which are also centrally recessed at 21 and 31 into which projects a rod 4 which again tightens the separate pot-like elements together by means of the nuts 41 and 42. However instead of the interfitting pot-like structures of FIG. 1, ring elements 15, 16, 17 and 18 are provided, which are joined together at the inside at their joints by means of annular coupling members 20, 21' and 22, and bonded to each other. To increase rigidity, at least one circular metal disc-like element is also provided to brace the jacket of the cylinder and impose the round shape. Preferably a plurality of such elements is provided, as shown at 23, 24, 25 and 26. In this case too, it is assured that an exactly cylindrical element is the result if care is exercised to assure that the end portions of the individual elements are machined precisely. As in the case of FIG. 1, the elements are clamped together by means of the lids 2 and 3, the rod 4 and the nuts 41 and 42. To prevent having to cover large proportions of the uncovered suction openings upon making use of smaller formats, one or more pot bases are produced without openings. The separate compartments may be connected to the vacuum pipe via valves. In the case of large rollers, these pressure-tight bases, or bulkhead, are endowed with a shape corresponding to the stress in the fashion of the bottom of a boiler.

The roller elements proposed in the present invention are particularly appropriate for drum scanners in the sphere of graphics or of other reproduction apparatus operating with rollers for reception of originals or record carriers.

We claim:

1. A roller for a drum scanner, comprising a hollow cylindrical element which is arranged for rotation at its ends, and comprising a plurality of pot-like structures which are joined together to form a continuous outer surface.

2. A roller according to claim 1, wherein the pot-like structures are shouldered at their ends for insertion into the next adjacent pot-like structure.

3. A roller according to claim 1, wherein the cylindrical element has lid-like members at its ends, which may be bolted together by means of a rod passing through the inside of the element.

4. A roller according to claim 1, wherein the surface of the roller is provided with suction openings which communicate with the interior of the roller.

5. A roller according to claim 1 wherein said pot-like structures are interfitted one within another, and are also bonded together.

6. A roller according to claim 1, wherein at least one circular metal plate is transversely disposed within the roller.

7. A roller according to claim 4, wherein at least one of the pot-like structures has no holes in its surface and is bonded to the next structure in pressure-tight manner.

8. A roller for drum scanners, comprising a hollow cylindrical element which is arranged for rotation at its ends and comprising a plurality of rings which are joined together at their joints by annular coupling members and also bonded to each other.

9. A roller according to claim 8, wherein at least one circular metal plate is transversely disposed within the roller.

10. A roller according to claim 8, wherein a bulkhead which has a shape corresponding to the direction of pressure and to the strain caused by the same, is inset in pressure-tight manner as a complement to a base or round plate.

11. A roller according to claim 8, wherein the cylindrical element has lid-like members at its ends, which may be bolted together by means of a rod passing through the inside of the element.

12. A roller according to claim 8, wherein the surface of the roller is provided with suction openings which communicate with the interior of the roller.

13. A roller according to claim 12, wherein at least one of the pot-like structures has no holes in its surface and is bonded to the next structure in pressure-tight manner.

14. A drum scanner roller comprising a plurality of rings of the same external diameter, joined together to form a continuous outer surface, each ring having opposed end faces, said rings being assembled in end to end axially aligned relation with the end faces of adjacent rings abutting each other to form a joint, an annular coupling within at least one end of each ring at a joint, means connecting adjacent rings at each joint to the annular coupling, and a circular transverse plate within and connected to an annular coupling.

15. A drum scanner according to claim 14, wherein an annular coupling and a circular plate are integral with at least one ring.

16. A drum scanner according to claim 14, wherein an annular coupling extends across each joint between rings.

17. A drum scanner according to claim 14, wherein the circular plate extends radially of a ring.

* * * * *